March 27, 1934.                F. O. WELLS                   1,952,190
                              LIMIT GAUGE
                         Filed July 13, 1928          2 Sheets-Sheet 1
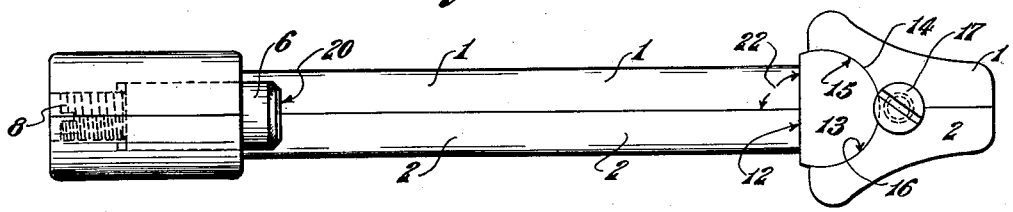
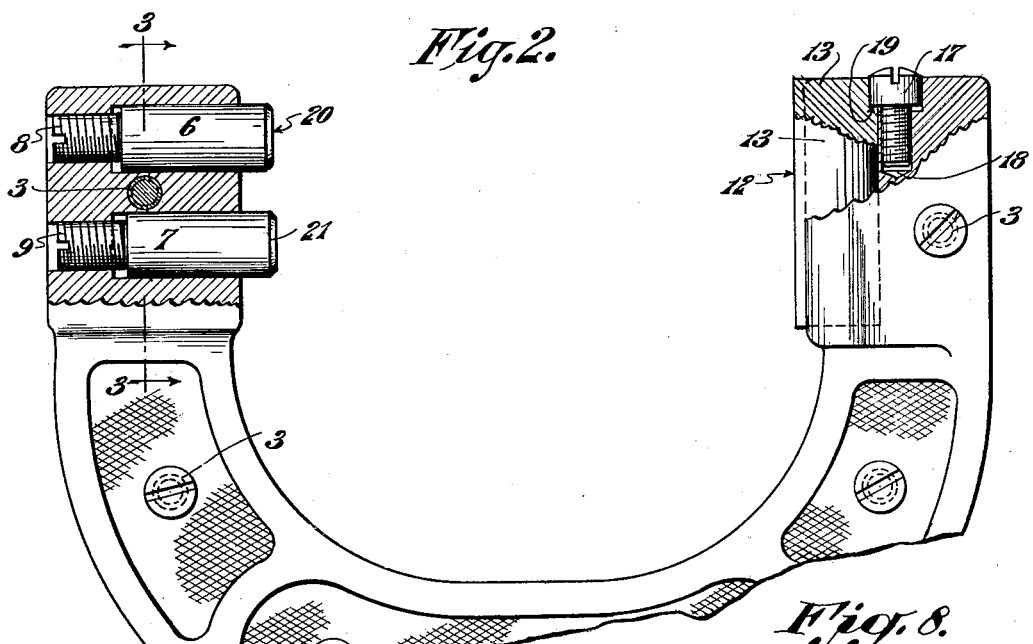
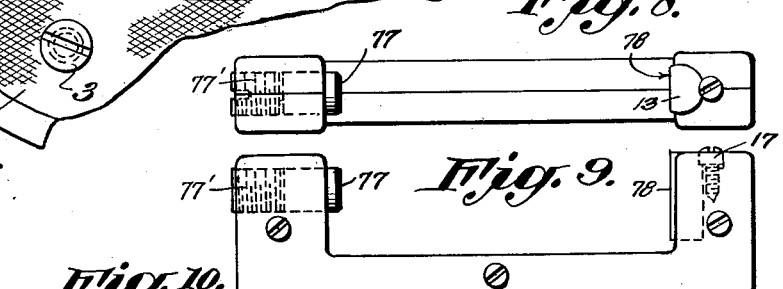
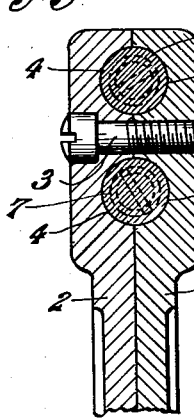
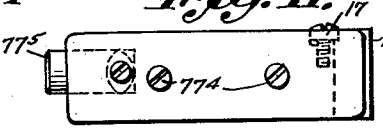
INVENTOR,
Frank O. Wells,
BY
Harry W. Bowen
ATTORNEY.

March 27, 1934.   F. O. WELLS   1,952,190
LIMIT GAUGE
Filed July 13, 1928    2 Sheets-Sheet 2
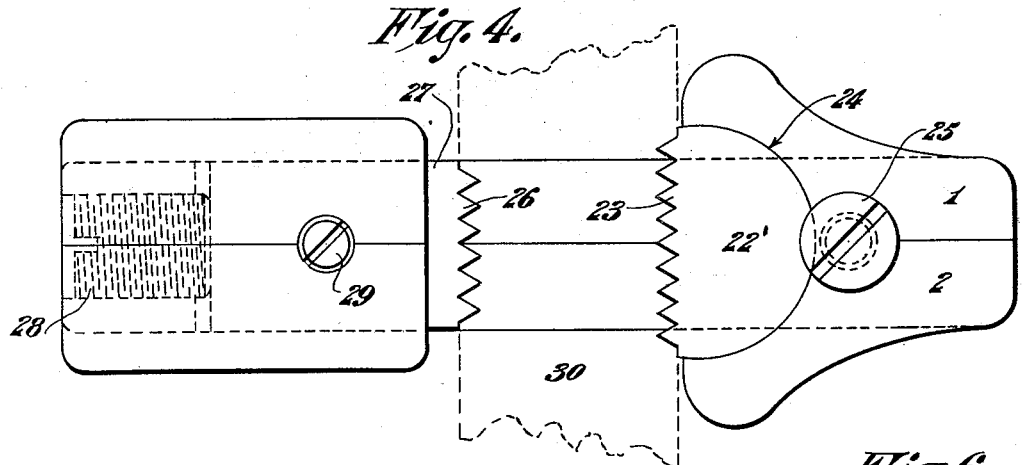
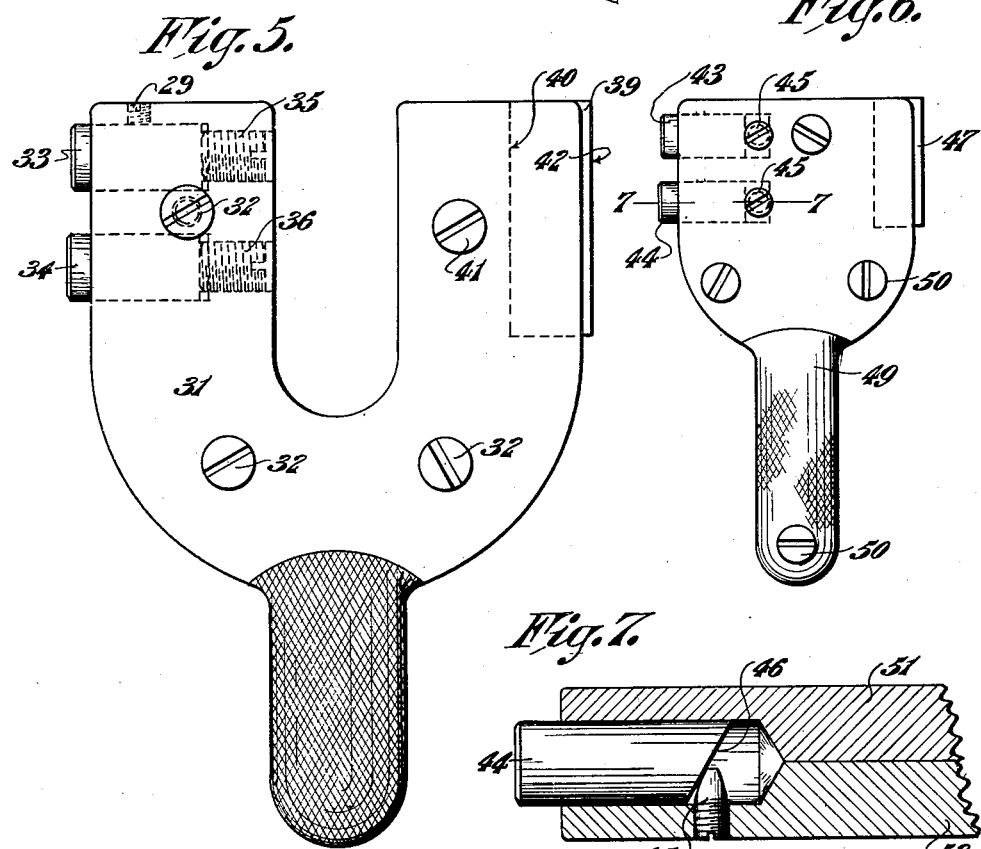
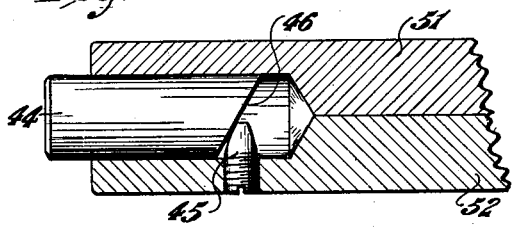
INVENTOR,
Frank O. Wells,
BY Harry W. Bowen
ATTORNEY.

Patented Mar. 27, 1934

1,952,190

UNITED STATES PATENT OFFICE 1,952,190

LIMIT GAUGE

Frank O. Wells, Greenfield, Mass.

Application July 13, 1928, Serial No. 292,578

5 Claims. (Cl. 33—163)

An object of the present invention is to provide such a gauge that may be very accurately and quickly adjusted to standard dimensions. A further object is to provide a gauge that may be constructed at a reasonable cost, by means of die stampings or drop forgings process. At the present time it is an expensive and slow process to accurately grind and assemble the contacting or measuring surfaces of the gauge as now constructed. That is to say, the surfaces that engage the part of the work that is to be measured. The improvement further provides means for making comparative readings of the piece of work under measurement on a suitable scale over which a pointer moves.

The improvement is designed to be used as a standard piece of apparatus for setting or comparing the setting of a micrometer or other tool which is to be used constantly by a workman.

The invention is designed to be adapted to various uses as measuring the diameters of threads, inside and outside measurements of different pieces of work, as for example, the internal diameter of an engine cylinder that is being ground.

Broadly considered, my improvement comprises two U-shaped members that may be formed by drop forging or otherwise. These members are placed side by side and secured together with any suitable means, as with machine screws. Located between and secured in place between these two members are the parts of the gauge which provide the measuring surfaces or anvils as they are sometimes termed. A device is provided for accurately positioning one of the measuring surfaces of said parts so that their faces are always in parallel relation to each other. This device consists in forming one of the surfaces of the measuring part on a curved surface so that it may be readily moved to bring its flat measuring surface into parallel relation to the other or fixed measuring surface, said part in cross section being D-shape, as will be fully described in the body of the specification with reference to the drawings.

Referring briefly to the drawings which form a part of the specification:

Fig. 1 is a top plan view of the limit gauge showing the two pieces comprising the body part of the gauge, one of the adjustable blocks with a curved surface at its outer surface and a flat measuring surface, also the fixed measuring member.

Fig. 2 is a side elevational view of Fig. 1, partially in section, illustrating the pieces or members which constitute the measuring elements of the gauge.

Fig. 3 is a transverse sectional view on the line 3—3 of Fig. 2.

Fig. 4 is a plan view showing the improvement when applied to a threaded piece for measuring the lead and pitch of a screw thread or, its root or pitch diameter.

Fig. 5 is a side elevational view of the gauge for measuring the internal dimensions of an opening.

Fig. 6 is a side elevational view of a gauge for measuring an internal opening and showing a modification for adjusting the movable contact measuring pieces of the gauge.

Fig. 7 is a sectional view on the line 7—7 of Fig. 6 showing the modification for adjusting the measuring pieces of the device.

Fig. 8 is a top plan view of a gauge which serves as a standard for setting or adjusting another gauge as that shown in Figs. 5 and 6.

Fig. 9 is a side view of Fig. 8.

Fig. 10 is a top plan view of an inside gauge.

Fig. 11 is a side view of Fig. 10.

Referring to the drawings in detail:

1 and 2 are two U-shaped flat metal pieces, or members, which are secured together, side by side, as shown, by means of the screws 3. Located in the U-shaped matching recesses 4 and 5 (see Fig. 3) in the inner surfaces of the pieces 1 and 2 are the two adjustable measuring pieces 6 and 7. 8 and 9 are two threaded screws engaging threaded openings in the pieces 1 and 2 for engaging the outer ends of the measuring pieces 6 and 7 for moving them inward the correct distance with reference to the flat measuring face 12 of the oppositely located piece 13. After the pieces 6 and 7 have been accurately adjusted they are clamped in place by tightening the screw 3.

The piece 13 is formed with a curved outer surface 14 which fits into the curved matching recesses 15 and 16 in the pieces 1 and 2, as shown in Fig. 1. For the purpose of firmly retaining the piece 13 in its adjusted position the clamping screw 3 is employed. The screw 17, which is threaded into a threaded recess 18 that is formed in the pieces 1 and 2, may, if desired, be employed to assist in retaining the piece 13 in place, after the face 12 of piece 13 has been adjusted in parallel relation to the faces 20 and 21. The lower or inner surface of the head of this set screw rests upon a shoulder 19 whereby when the screw 17 is firmly turned against the shoulder 19 the piece 13 is retained in its adjusted position. In practice the screw 17 would probably be omitted, and only the tightening screw 3 employed as a simplified structure.

An important feature of my improvement lies in the construction of the piece 13. By reason of the curved surface 14 it is a comparatively simple matter to align the face or surface 12 exactly in parallel relation with the faces or surfaces 20 and 21 of the pieces 6 and 7. This parallel relation is indicated by the reference numeral 22, which refers to the angle of 90° between the face 12 and the center line or meeting surfaces of the two U-shaped members 1 and 2, as shown. This construction of the piece 13 effectually provides a very simple and inexpensive method of accurately adjusting the parallel relation between the surfaces 12 and 20, and between the surfaces 12 and 21. The pieces 6, 7 and 13 are formed and finished before assembling, thereby entirely eliminating any finishing, as grinding, filing, or buffing after they are assembled in the pieces 1 and 2. This is an important feature from a constructional side of the gauge.

In limit gauges, as now constructed the measuring surfaces are an integral part of the handle of the gauge and must be finished which is not only slow and expensive but not a very accurate method. It is of course understood that the distances between 12 and 20 is the "go" distance of a piece being measured, and, the distance between 12 and 21 is the "no go" distance. The parts 1 and 2 serve as the handle part of the gauge.

Referring to Fig. 4 in which the U-shaped pieces 1 and 2 are provided, as shown in Fig. 2. 22' designates a part that is formed with the threads 23. This part is formed with the curved surface 24. It is retained in place by means of the clamping screws which retain the pieces 1 and 2 firmly together after the threads 23 have been accurately positioned with reference to the threads 26 of the piece 27. The piece 27 is moved forward by means of the adjusting screw 28 and may be, if desired, retained in place by the set screw 29. 30 represents a piece of work on which a thread is being or has been formed. The distance between the threads 23 and 26 of the pieces 22' and 27 accurately determines the dimensions of the thread that should be formed on the piece 30 or in other words; it is a "go" and "no go" thread gauge. The structure shown in Figs. 1 and 2 are changed by substituting the pieces 22' and 27 for the pieces 13 and 20 or 21.

Referring to Fig. 5, which is a gauge for determining inside dimensions. The U-shaped pieces 31 are secured together, as before, by means of the clamping screws 32. 33 and 34 are pieces similar in construction to the pieces 6 and 7 of Fig. 2. They are adjusted by means of the screws 35 and 36 and secured in place by the clamping screw 32. The piece 39 is formed with a curved rear surface 40 which fits into the curved surface of the piece 31 and is retained in its adjusted position by means of the set screw 41. The distance between the surfaces 33 and 42 would represent the "go" or under size distance of the internal measurement and the distance between the pieces 34 and 42 would be the "no go" dimension.

Referring to the construction shown in Fig. 6, which is similar to that shown in Fig. 5, the pieces 43 and 44 correspond to the pieces 33 and 34 of Fig. 5. These are adjusted by means of the set screws 45, one of which is shown in detail in Fig. 7, on a larger scale. The tapered inner end of this screw engages the inclined surface 46 which will of course when turned inward move the pieces 43 and 44 outward. 47 is a piece similar to the piece 42 and is retained in place by the clamping screws 50. It is a smaller gauge than that shown in Fig. 5 and is used for making internal measurements. 49 is a handle portion. 50 are screws for securing the pieces 51 and 52 together.

Figs. 8 and 9 embody the same general construction as that set forth in Figs. 1 and 2. The construction in these figures is designed for use as a standard of measurement. That is to say the distance between the surfaces 77 and 78 are set with reference to a standard gauge and are used to set or adjust the distance between the measuring surfaces 13' and 77$^5$ in Figs. 10 and 11. 77' designates the adjusting screw.

Figs. 10 and 11 represent a tool which is designed to be set with reference to a standard gauge for inside measurements. The gauge shown in Figs. 8 and 9 may be used for that purpose. The U-shaped construction shown in Figs. 10 and 11 is the same as that shown in Fig. 8. In Fig. 10 the part 77$^2$ is adjusted by means of the screw 77$^3$. 77$^4$ are clamping screws for securing the parts 77$^5$ and 77$^6$ together.

What I claim is:

1. A measuring instrument comprising a U-shaped frame member, a plurality of movable measuring members, therein having measuring faces, a measuring member D-shaped in cross-section mounted in said frame member and formed with a curved and a flat surface, adjustable securing means engaging the D-shaped measuring member, means to permit the movement of the D-shaped member to be aligned with its flat face surface in parallel relation with the measuring faces of the said first mentioned measuring members, and said means also serving to secure the D-shaped member in its adjusted position.

2. A "go" and "no go" gauge, comprising a two part frame with arm portions, two movable members with measuring surfaces in an arm thereof, the other arm having a single rounded recess in each frame part, said recesses together forming a larger recess, a part with a flat or straight measuring anvil surface and a curved surface located in said larger recess to permit its adjustment about its axis in the said recess for positioning the flat anvil surface relative to the measuring surfaces of the two movable members, and means for retaining the said part with a curved surface in a position for bringing its anvil measuring surface in parallel relation to the measuring surfaces of the two movable members, in the other arm.

3. A gauge device comprising a U-shaped member having rounded recesses in an arm thereof, work engaging parts in said recesses, an anvil member D-shaped in cross section, means for adjusting, and means for securing the said work engaging parts in place in their respective recesses, the other arm of the U-shaped member having the said D-shaped member located therein with the flat part of the same located opposite the work-engaging parts, means engaging the D-shaped member for locating a face of the D-shaped member with reference to the work measuring parts.

4. A measuring instrument, comprising in combination, a pair of complemental U-shaped members each of which is formed with registering recesses, and which together form a frame having recesses to receive measuring members having measuring faces, a measuring member located in each recess, one of said measuring members being D-shaped in cross section to permit positioning its flat face relative to the other measuring member, means for adjusting, and means for securing the other of said measuring member relative to said frame, means for securing the D-shaped member in the frame, whereby the D-shaped member may be turned about its axis for aligning its measuring face or flat side with the measuring face of said first mentioned member.

5. A measuring instrument, comprising in combination, a pair of complemental members each of which is formed with registering recesses, and which together form a frame having recesses to receive measuring members having measuring faces, a measuring member located in each recess, one of said measuring members being D-shaped in cross section to permit positioning its flat face relative to the other measuring member, means for adjusting, and means for securing the other of said measuring member relative to said frame, means for securing the D-shaped member in the frame, whereby the D-shaped member may be turned about its axis for aligning its measuring face or flat side with the measuring face of said first mentioned member.

FRANK O. WELLS.

CERTIFICATE OF CORRECTION.

Patent No. 1,952,190.  March 27, 1934.

FRANK O. WELLS.

It is hereby certified that error appears in the printed specification of the above numbered patent requiring correction as follows: Page 2, line 107, claim 1, after "members" strike out the comma; and that the said Letters Patent should be read with this correction therein that the same may conform to the record of the case in the Patent Office.

Signed and sealed this 15th day of May, A. D. 1934.

Bryan M. Battey (Seal)  Acting Commissioner of Patents.